United States Patent Office 3,325,971
Patented June 20, 1967

3,325,971
METHOD OF REJUVENATING AN ADSORBENT
Aristides Rosman, Orange County, Calif., assignor to Chevron Research Company, a corporation of Delaware
Filed Dec. 20, 1963, Ser. No. 332,189
12 Claims. (Cl. 55—62)

The present invention relates to an improved method of fractionating gaseous mixtures and pertains more particularly to the adsorption of condensable hydrocarbons from natural gas. The invention is more especially directed to a novel method of rejuvenating an adsorbent used in a system of adsorptive separation of gaseous mixtures.

A known method for separating and recovering, for example, condensable hydrocarbon fractions from natural gas is to pass the natural gas over an adsorbent, such as silica gel, which is capable of retaining the hydrocarbons on its active surface. The gas which emerges from the adsorption is depleted of the heavier hydrocarbons and is composed mainly of methane with smaller proportions of ethane, propane and butane. The adsorption step is continued until the emerging gas increases in amount of pentane or heavier hydrocarbons, at which point the pentanes are said to be "breaking through." Although the adsorbent is still capable of removing some heavier hydrocarbons, continuation of the adsorption after breakthrough of pentanes results in a loss of recoverable, condensable material. It is, therefore, necessary at or before the step at which pentanes break through to reactivate the adsorbent by removing the hydrocarbons absorbed onto it.

The reactivation or regeneration cycle alternates with the adsorption cycle in such a way that at any given time one bed of adsorbent is actively adsorbing the condensable hydrocarbons from the natural gas while at least one other bed of adsorbent is being reactivated and made ready for reuse in adsorption. In modern short cycle adsorption installations, the duration of a cycle ranges from about 20 to 35 minutes.

It has been said that the conditions affecting adsorption and hence controlling for the methods of adsorbent regeneration now in general use are: an increase of the temperature of the adsorption system results in a decrease in the adsorption capacity of the adsorbent and an increase in pressure results in an increase in the adsorption capacity. See, for example, the discussion by W. M. Dow under the title, "Vapor Phase Adsorption in Gas Processing," at page 69 et seq. in "Advances in Petroleum Chemistry and Refining," vol. 4, Interscience Publishers, Inc., New York (1961). The regeneration methods now in use are based on the aforesaid knowledge and are limited to the following two basic approaches: (1) increasing the temperature of the adsorbent to the point where only negligible adsorption is possible thereby desorbing the adsorbed material, or (2) decreasing the pressure of the system in order to desorb.

The regeneration of a saturated adsorbent by heating is by far the most commonly used of the two basic methods. Heating of the adsorbent bed is by direct contact between the adsorbent and hot gas, normally a heated natural gas. To minimize heat loss, internal insulation is often used. Undesirable characteristics of the high temperature regeneration method include the lowered condensation efficiency of the hydrocarbon stripped from the adsorbent because of the large volume of diluting gas. Also, the repeated thermal shock of the adsorbent particles results in attrition which, in turn, causes an increased pressure loss in the system. The heating and cooling operation repeated in a short cycle adsorbent plant up to 72 times a day requires a sizeable fraction of the total gas output for fuel. Further, in the majority of installations, since the adsorption cycle time is determined by the time needed for regenerating and cooling of the adsorbent, adsorption is extended beyond its optimum time interval, to a point where part of the recoverable hydrocarbons will emerge with the sales gas.

Low pressure regeneration does not appear practical for large scale installations where recompression costs would be prohibitive. Further, the adsorbent is subjected to great mechanical attrition due to the pressure release which, in the case of condensable hydrocarbon recovery, ranges from ratios of 25 to 1 up to about 75 to 1.

Thus, the method chosen for regeneration of the adsorbent is of primary importance to the length and hence to the efficiency of the adsorption cycle, to the efficiency of condensation recovery to fuel and power requirements and to installation construction costs. Consequently, the present invention is important because it provides a novel method of regenerating the adsorbent bed in a manner permitting improved efficiency of adsorption and liquid hydrocarbon recovery, particularly a short desorption cycle and economic changes in the structure of the adsorption apparatus.

In accordance with the present invention, there is provided a novel method of regenerating an adsorbent used in a system of adsorptive separation of gaseous mixtures. This method of adsorbent regeneration is carried out in a manner directly contrary to the methods and concepts heretofore applied to such adsorptive separation of gaseous mixtures. Hence it is now proposed to regenerate saturated adsorbents by a method based on the finding that adsorptive separation of gaseous mixtures on a surface active adsorbent increases with increasing pressure up to a maximum and then decreases at still higher pressures to a minimum.

Briefly, the improved process of the present invention comprises passing a suitable gaseous feed such as a natural gas containing gasoline components over an adsorbent at a pressure preferably near that at which maximum adsorption takes place in order to adsorb said natural gasoline components on to said adsorbent. After a substantial amount of the heavier gasoline components have been adsorbed on the adsorbent and the heavier components are at or near the point of breaking through, the passage of the feed over the adsorbent is discontinued. Then the adsorbate is recovered and the adsorbent regenerated by passing a gas over the adsorbent at a pressure which is greater than each of (1) the pressure at which maximum adsorption takes place and (2) the higher of the two pressures at which the adsorption is the same as in said adsorbing step.

Figure 1:
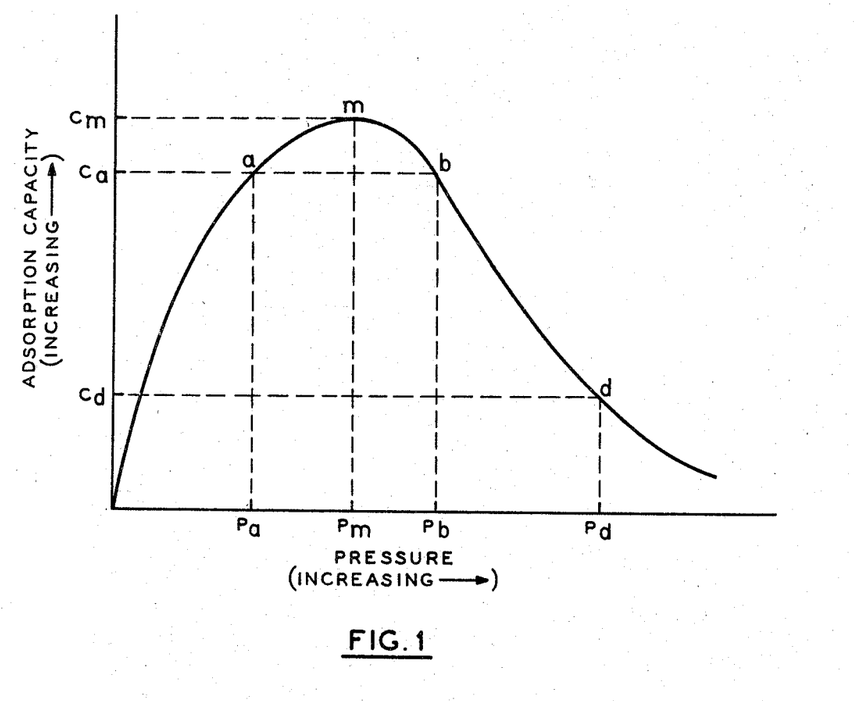

The present process is illustrated in FIGURE 1 which is a chart of the adsorption capacity versus pressure for a heavier hydrocarbon component associated with methane as in a "wet" or "rich" natural gas. At pressure $P_m$ the adsorption capacity is at a maximum $C_m$ and at pressures above and below $P_m$ the adsorption capacity is less. It will be particularly noted that as the pressure is increased to substantially higher pressures the adsorption capacity decreases to essentially zero. It will be seen that if adsorption is conducted at some pressure $P_a$ near the maximum adsorption pressure $P_m$, there is another pressure $P_b$ at which the adsorption capacity is the same as at $P_a$. Hence, desorption is conducted at some pressure $P_d$ which is substantially higher than $P_b$.

The process is applicable to the recovery of natural gasoline components, i.e., propane, butane, pentane and heavier hydrocarbons from natural gas having such compounds dispersed therein, i.e., a "wet" natural gas.

The process is particularly suitable for treating natural gas containing of the order of 0.1 to 0.3 g.p.M (gallons per thousand cubic feet) of condensables, and wherein substantially complete recovery of these heavier hydrocarbons, especially the pentanes and heavier, is desired.

When applied to high pressure natural gas, such natural gas is preferably used in the desorption step and the resulting enriched high pressure gas effluent is flashed to a lower pressure causing condensation of the heavier hydrocarbons, which then may be recovered. Also, preferably the refrigerating effect of the high pressure gas flashing is utilized through heat exchange to condense part of the heavier hydrocarbons in the high pressure natural gas feed, thereby reducing the concentration of the heavier components in the feed going to the desorption step. Thus, a preferred embodiment of the process comprises the steps of passing the high pressure natural gas (normally after the above-mentioned heat exchange and condensation to obtain a partially depleted high pressure gas) through a bed of adsorbent having adsorbed thereon heavier gasoline components from a prior adsorption cycle, then flashing the resulting enriched gas effluent to a selected lower pressure, recovering the heavy hydrocarbons condensed during the flashing and then passing the remaining gas at the selected lower pressure, which is preferably near the pressure of maximum adsorption, over a fresh or regenerated bed of adsorbent to adsorb thereon natural gasoline components from the feed. The effluent gas from this second adsorbent bed contains little of the heavier components.

The above new process eliminates the troublesome heating and cooling steps that are features of regeneration-desorption in prior processes. Because of the novel method of regeneration, the time intervals allowed for desorption and flashing of the enriched desorption gas used as feed in the adsorption step need not exceed the length of time for the adsorption step. Hence the bed of adsorbent after being desorbed of the adsorbate is ready for use in the adsorption step and the bed of adsorbent which has become saturated with adsorbate is ready for the desorbing step, there being no need to cool or heat a bed of adsorbent. For example, to regenerate substantially completely a silica gel adsorbent saturated with isopentane at 600 p.s.i.g., it took one hour with flowing gas at 600° F. and 600 p.s.i.g. whereas it only took several minutes with a methane stream at 2400 p.s.i.g. and 74° F. A comparison of the present process with prior processes reveals a number of basic differences including the following:

(1) In the present method the length of the adsorption cycle is determined by the optimum adsorption conditions, i.e., the time at which the lightest component desired to be adsorbed breaks through and not by the time needed for preparing through regeneration and cooling another saturated adsorbent bed for adsorption service as in the case of the usual methods of regeneration by heating.

(2) No heat is required for regeneration although it may be desirable to provide heat periodically to drive off water accumulated on the adsorbent. Where no high pressure gas source exists and compression of a fraction of the gas is necessary, the heat resulting from the compression can be used to increase the temperature of the bed during desorption. However, no external heat need be applied and the heat resulting from compression is not necessary to the process.

(3) No inner insulation of the adsorption columns is required and hence this item of construction cost can be eliminated. Where the treatment is applied to natural gas which is available at the desired high pressure, no expensive cooling equipment is required since, as indicated above, condensation from the enriched gas can be obtained by pressure reduction. Also, heat exchange equipment is reduced to a minimum.

(4) Condensation efficiency is high in the present process because there is no excess diluting lean gas or possible deficiencies in the cooling system as occurs with the prior systems of regeneration by heating. The increased pressure differential between the absorption and desorption steps promotes the regeneration of the adsorbent and therefore increases the efficiency of liquid recovery.

(5) The mechanical attrition due to thermal shock in prior methods is minimized. The pressure variation in the present process is usually of the order of 4 to 1 pressure ratio and relatively slow depressurization over the adsorbent can be used to further minimize attrition due to pressure changes.

(6) Stress resistance of materials used for high pressure equipment decreases with increasing temperature. The present high pressure regeneration method is therefore inherently safer because little heating of the system is needed.

Suitable gas adsorbents for use in the present process include, for example, activated carbon, silica gel, activated alumina and mixtures thereof such as a mixture of silica gel and activated alumina or charcoal as well as other high surface adsorbents including molecular sieve type materials such as the naturally-occurring and synthetic zeolites having pore diameters up to 12 to 15 or more. In the recovery of natural gasoline components from natural gas, silica gel is normally preferred. The various adsorbents can be in the form of beads or granules of sizes suitable for efficient contact with gases as known to one skilled in the art.

While the numerical values for the adsorption capacity versus pressure are dependent upon gas composition, the nature of the adsorbent and the temperature, the maximum adsorption pressure and the accompanying reduced adsorption capacity at higher pressures were found throughout a wide range of conditions. In general the maximum adsorption pressure decreases with decreasing temperatures of the adsorption system. However, for natural gas separations the temperature is usually no lower than that which gives a maximum adsorption pressure near the pressure of the dry or so called "sales" gas pipeline pressure, since otherwise the lean gas produced in the adsorption cycle would have to be compressed to utility gas pipeline pressure. The preferred temperature range of operation for the treatment of natural gas is from 0° F. to 150° F., and more especially preferred, 60–120° F. With an increase in the boiling point of the hydrocarbon to be adsorbed and separated from the lower molecular weight hydrocarbons, the adsorption capacity-pressure curve above the maximum adsorption pressure becomes steeper.

As stated, the process of the present invention is operated with the pressure in the adsorption stage preferably at or near the maximum adsorption pressure and with a pressure in the desorption-regeneration stage at a pressure which is greater than each of (1) the pressure at which maximum adsorption takes place and (2) the higher of the two pressures at which the adsorption is the same as in the adsorption stage. Usually the pressure of adsorption will be in the range of 300 to 1200 p.s.i. and the pressure of desorption will be at least 200 and preferably 300 pounds higher than the pressure in the adsorption stage. While the process is illustrated with the preferred use of high pressure natural gas in the desorbing step, low pressure gas such as produced in the process, can be compressed for use in desorbing.

Figure 2:
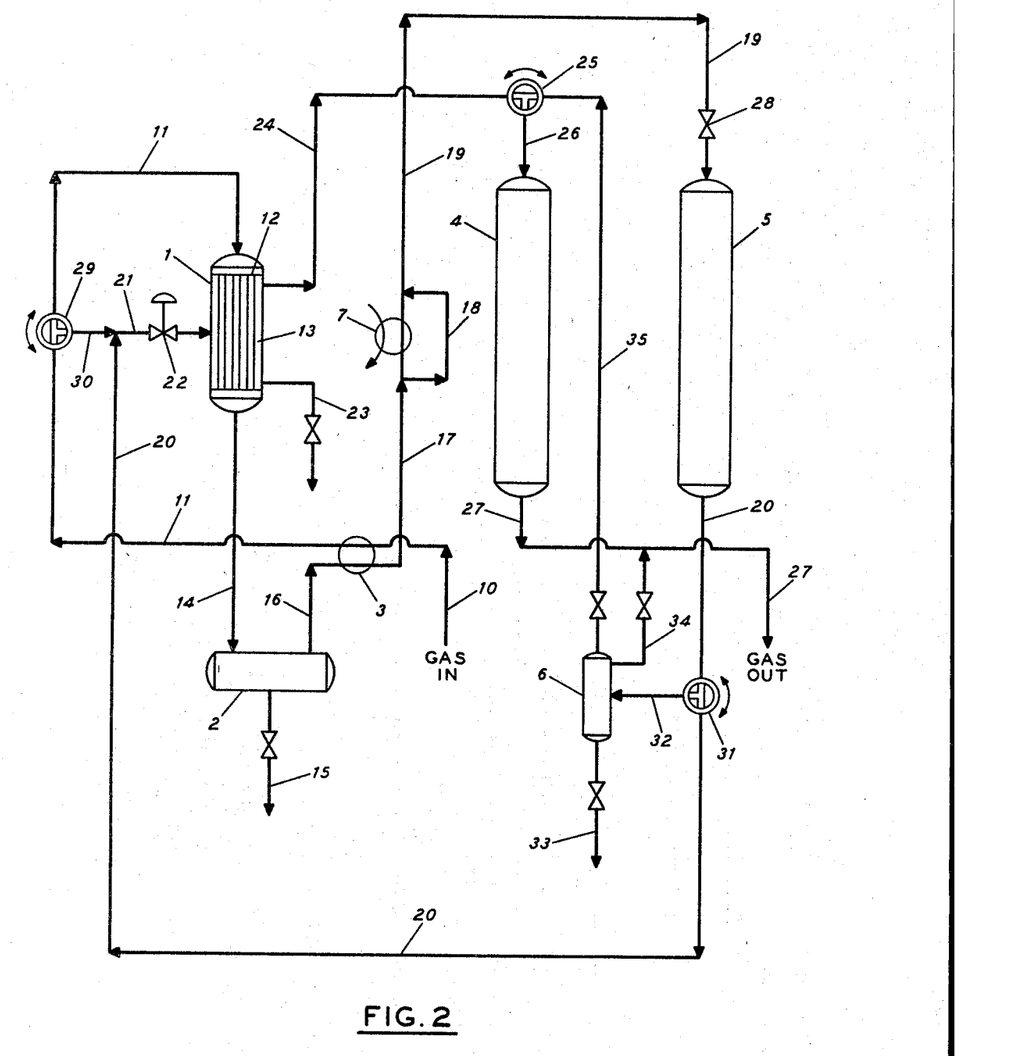
Figure 3:
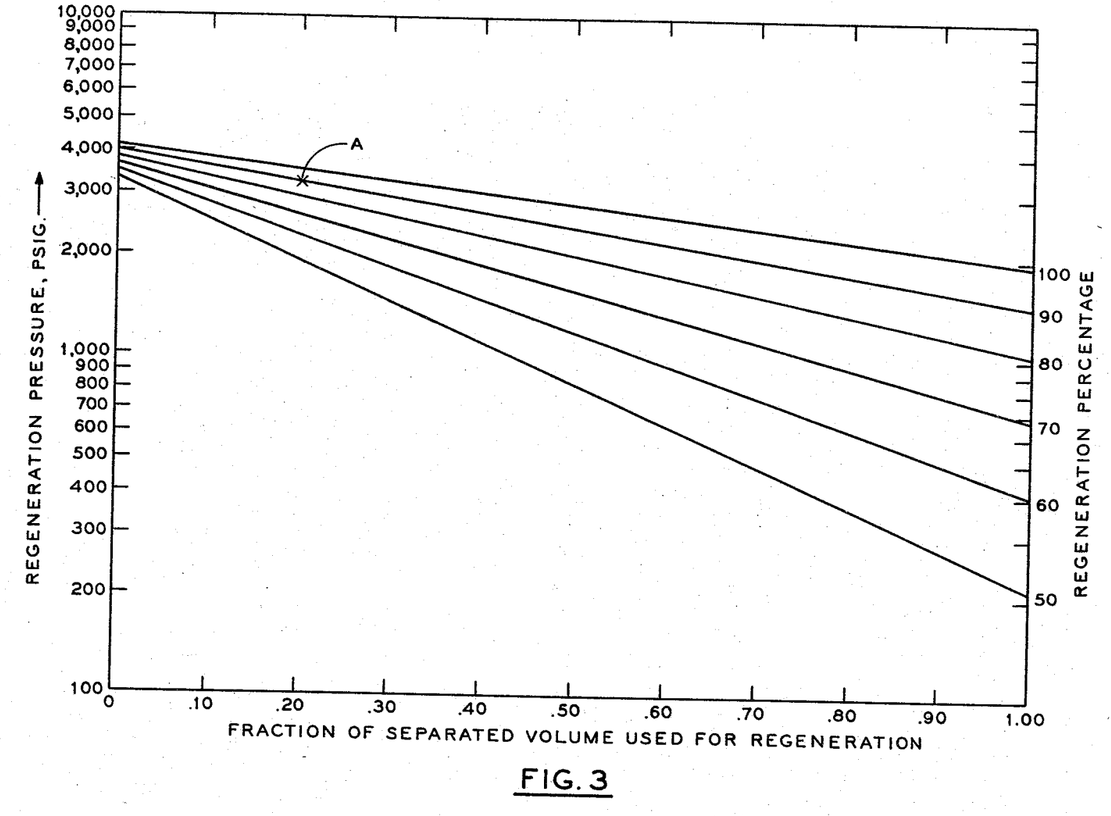

The process of the present invention and its advantages will be more fully understood from the following detailed description taken in connection with FIGURE 2 which is a schematic flow diagram of one embodiment for carrying out the present invention with high pressure natural gas as feed, and FIGURE 3 which is a chart illustrating the fraction of the total high pressure gas volume needed for the regeneration when treating high pressure natural gasoline in accordance with the present invention.

In the schematic flow diagrams in FIGURE 2 of the drawings, various devices, such as valves, pressure regulators and recorders, by-pass lines, and the like as well as manifolding for switching streams from one vessel to another, have been omitted since such equipment is conventional and can be supplied by one skilled in the art. Likewise, where one vessel is shown, two or more may be used in series or in parallel.

In the embodiment illustrated in FIGURE 2 of the drawings, the major pieces of equipment are the flash drum-heat exchanger 1, a knock-out drum or other suitable liquid-vapor separator 2, heat exchanger 3, adsorption columns 4 and 5, and auxiliary flash drum liquid separator 6 and an optional heat exchanger 7. Manifolding and valves (not shown) are provided for switching columns 4 and 5 through alternate adsorption and desorption cycles. For illustrative purposes only, two adsorption columns are shown although a larger number of columns can be used. The construction of the adsorption columns may be conventional, although the usual internal insulation can be omitted since heat conservation is not necessary for the present method. Further, the usual large diameter shell construction for the adsorption columns can be replaced by a bank of relatively small diameter tubes containing the adsorbent or by a number of small diameter columns.

In accordance with the embodiment illustrated in FIGURE 2, wherein all the high pressure gas feed is used for the desorption, the treatment is as follows: a waterless (i.e., water-free) natural gas containing recoverable amounts of condensable components (i.e., "rich" gas) is introduced through line 10 at a pressure, for example, of about 2000 p.s.i. and passes through heat exchanger 3 wherein it is cooled by exchange with a stream to be later identified. The cooled gas passes through line 11 into heat exchanger 1 wherein the high-pressure, saturated gas is further cooled in the tube section 12 by exchange with gas that is flashed in section 13 of the flash drum-heat exchanger 1. As a result of the refrigerating step, part of the condensable hydrocarbons separate as liquid and the two phase mixture passes from the flash drum-heat exchanger 1 through line 14 into knock-out drum 2. The liquid is separated from the mixture in drum 2 and is withdrawn through line 15 as recovered natural gasoline. The remaining high pressure gas is withdrawn from 2 through line 16 and passes through heat exchanger 3 to pre-cool the incoming natural gas.

In this preferred embodiment of the invention, the gas issuing from heat exchanger 3 through line 17 is increased in temperature but its pressure remains constant so that the net result of the heat exchange is to produce a high pressure gas incompletely saturated with condensable hydrocarbons. A larger decrease in the saturation of the gas can be easily attained by further increasing the temperature such as to slightly higher than ambient by passing the gas through heat exchanger or other heating means 7. Since the further increase in temperature of the gas by application of external heat is optional, the heat exchanger 7 can be bypassed by line 18. The production of an incompletely saturated gas by the arrangement described above accelerates the regeneration of the adsorbent bed and as such is a preferred part of the process of the present invention.

The high pressure gas then passes through line 19 into and through adsorption column 5 for regeneration of the adsorbent. At the beginning of the regeneration cycle, the bed of adsorbent in column 5 is saturated with adsorbate and is at the lower pressure (e.g., 600 p.s.i.) used in the adsorption cycle. To effect the regeneration the flow of high pressure, unsaturated natural gas is passed through column 5, the resulting increase in pressure establishing an equilibrium corresponding to the reduced adsorption capacity for the adsorbent at the high pressure. As a consequence the adsorbate is stripped from the adsorbent and passes out of the column through line 20 in admixture with the high pressure gas.

In FIGURE 3 are presented the results of regenerating a silica gel adsorption bed saturated with heptane, the linear flow rates being the same throughout, about 1 ft./min. In these series of tests a methane saturated with n-heptane at 600 p.s.i.g. was passed over the adsorbent bed until the bed became saturated with heptane. Thereafter methane was passed over the saturated adsorbent bed at a series of different pressures, namely, 1600, 2000 and 2400 p.s.i.a. For each pressure, a number of volumes of gas were selected for regeneration and after passing the selected volume of regeneration gas over the adsorbent, feed gas (methane saturated with heptane) was passed over the adsorbent again to determine the volume of gas that could be treated before the selected heavier component broke through. By comparing the adsorption after regeneration to the original adsorption capacity, the regeneration gas volumes were determined in terms of the fraction of the gas volume that could be separated in the adsorber up to the time that heptane first emerges from the column (i.e., the separated gas volume). This separated volume parameter clearly presents the regeneration possibilities for any adsorption system as a function of the original capacity of the adsorbent. Thus, for example, the condition indicated at point A on FIGURE 3 shows that if an adsorption bed which can separate gas volume V at its initial activity before becoming saturated with heptane, is regenerated by passing 0.2 V volume of gas at a pressure of 3280 p.s.i.g. the adsorbent bed will show 90% of its original activity during the following adsorption cycle; that is, it will separate 0.9 V volume of feed gas. However, in practice smaller amounts of regeneration gas are needed because the adsorbent is usually not saturated with hydrocarbons as heavy as heptane but usually with pentanes in equilibrium with smaller amounts of butanes plus hexanes and heavier materials as occur in natural gas. Further, the data in FIGURE 3 illustrate that the higher pressures bring about more rapid regeneration of the adsorbent. FIGURE 3 also indicates that all other conditions being equal, increasingly higher volumes of gas are needed for each 10% increment in regeneration efficiency desired. Therefore, it is often more economic to stop regeneration before removing 100% of the adsorbate. Thus the flow rate of high pressure gas is preferably regulated so that the gas stream leaving the regenerating adsorbent column is substantially completely saturated with condensable hydrocarbons.

Referring again to FIGURE 2, the high pressure enriched gas withdrawn from absorbent column 5 through lines 20 and 21 is passed to flash drum-heat exchanger 1. A pressure reduction device 22 is indicated in line 21 to control the pressure reduction to the selected pressure of, for example, 600 p.s.i. The liquid separated through flashing in the flash section 13 of flash drum 1 is withdrawn through outlet 23 as recovered natural gasoline. The temperature drop due to the flashing used to refrigerate the high pressure feed gas as indicated above.

The expanded low pressure gas resulting from the flash operation passes through line 24, three way valve 25 and line 26 to freshly regenerated adsorption column 4. Therein adsorption of the natural gasoline components takes place at the reduced pressure until the adsorbent becomes sufficiently saturated and the adsorption cycle is completed. The fraction of the gas which is depleted of its natural gasoline components in the adsorption column 4 is withdrawn through line 27 and is sent as dry gas, either directly or through storage, to the pipeline for use as commercial heating gas.

The length of the adsorption cycle is usually regulated to coincide with the breakthrough of any of the natural gasoline components which it is economic to recover substantially completely. At the end of the adsorption cycle the flow of low pressure gas in line 24 is switched from one adsorption column to another freshly regenerated adsorption column by suitable manifolding means (not shown) so that the adsorbing bed begins its regenerating cycle by the admission of high pressure gas while at the same time the pressure is lowered in the regenerated bed in preparation for a new adsorption cycle.

It is preferable in this embodiment not to have the end of the regeneration cycle coincide with the beginning of the adsorption cycle in order to avoid attrition of the adsorbent due to the sudden pressure release. Suitable provision can be made for time to depressure the regenerated absorbent bed before it is placed in an adsorption cycle. As illustrated by reference to FIGURE 2, the depressuring of the high pressure desorbent bed can be done by closing valve 28 in the high pressure gas inlet to the adsorbent bed 5 and simultaneously opening through three way valve 29 the decompression by-pass line 30 so that the flow of high pressure gas is continuously maintained. Then the high pressure gas from the regenerated adsorbent column 5 is released through line 20, three way valve 31 and conduit 32 to decompression drum 6 where it is flashed to the pressure used for adsorption. Any liquid separated in decompression drum 6 is withdrawn through outlet 33 for recovery as natural gasoline. The decompressed gas in drum 6 is withdrawn and passed either through line 34 to sales gas or added through conduit 35 to the main stream of low pressure gas going to the adsorption column 4 for further recovery of the condensable hydrocarbons remaining therein.

While the decompression method indicated above can be used in connection with the full flow of high pressure gas through the regenerating adsorption bed, only a fraction of the total high pressure gas volume is normally needed for most operations in the recovery of natural gasoline component from natural gas as indicated by FIGURE 3. Hence, in the preferred use of only part of the high pressure feed gas for regeneration, the flow scheme around the flash drum-heat exchanger 1 shown in FIGURE 2 can be modified by inserting a controlled pressure drop device in line 30. In such modification the fraction of high pressure gas required for regeneration goes through line 11 and continues its flow on to the regenerating adsorbent column 5. The rest of the high pressure gas goes directly to the flashing operation in flash drum 1 through conduit 30 which in this arrangement stays open throughout the several cycles. The controlled pressure drop device balances the pressure drop of the rest of the system and insures the continuity of gas flow in both the lines 30 and 11. With both of these lines 11 and 30 remaining open to the high pressure gas, the synchronization during the switchover from regeneration to adsorption as previously described is no longer necessary. Rather the depressuring can proceed by closing the high pressure gas inlet to regenerated adsorbent column 5 and the gas emerging from this column 5 is then passed through line 32 to decompress in drum 6. A pressure regulating device of conventional design (not shown) associated with the decompression drum 6 maintains the effluent gas at a constant pressure, dry pipeline gas pressure if the gas is sent through line 34 and the adsorption pressure of the system if the alternate flow through line 35 is used.

The above described modification, whereby only a fraction of the total high pressure gas volume is used for regeneration, is preferred. In such preferred arrangement, the first part which is reduced in pressure suitably can be 1 to 3 or 4 parts of the total feed for each second part used at the high pressure. In most instances the refrigration of the high pressure gas in the heat exchanger flash drum is more efficient and hence more hydrocarbons are condensed before the gas contacts the adsorbent. Further the low pressure gas can be sent to the adsorption step at temperatures lower than ambient which results in a more effective adsorption on account of the fact that the adsorption capacity increases with decreased adsorption temperatures.

While for illustrative purposes the process has been shown with the gas flow in the same direction for both the adsorption and regeneration, counterflow regeneration is often more desirable since it permits a sharper breakthrough of the key component of the adsorbate and generally results in a greater percentage of recovered gasoline fraction. The manifolding and valving necessary for such counterflow regeneration can be provided by one skilled in the art.

Since most of the adsorbents used for recovery of condensable hydrocarbons from gaseous mixtures are also desiccants, it is important to take into account the possible presence of water in the feed mixture. To avoid formation of hydrates upon refrigeration of a water-saturated natural gas, conventional methods can be used such as the addition of hydrate inhibitors to the gas or elimination of the water content from the high pressure gas. Water in the gas can be eliminated by the use of an adsorption column to pre-dry the high pressure gas, the water adsorption column being periodically regenerated by conventional means such as passing a heated gas through the column. Other arrangements can be provided for handling water and other contaminants in the high pressure gas feed.

Some of the typical adsorption-regeneration sequences possible by the new method are listed below, using the following abbreviations:

A—Adsorption step
R—High-pressure regeneration step
W—Water adsorption
WR—Regeneration of the water adsorber (a) High-pressure waterless gas source—two adsorption columns.

| Cycle No. | Col. 1 | Col. 2 |
|---|---|---|
| 1 | A | R |
| 2 | R | A |

Then repeat the above sequence.

(b) High-pressure waterless gas source—three adsorption columns. Adsorption cycle twice the length of regeneration time.

| Cycle No. | Col. 1 | Col. 2 | Col. 3 |
|---|---|---|---|
| 1 | A | A | R |
| 2 | A | R | A |
| 3 | R | A | A |

Then repeat the above sequence.

It should be noted that, while in a conventional three-column short-cycle adsorption plant, each column is active one-third of the total operation time, with two-thirds of the time spent on heating and cooling, in the sequence shown above two-thirds of the total operation time is spent on adsorption. Thus with the present invention adsorbent utilization is increased 100%.

(c) High-pressure water-saturated gas source—three adsorption columns with periodical regeneration.

| Cycle No. | Col. 1 | Col. 2 | Col. 3 |
|---|---|---|---|
| 1 | A | W | R |
| 2 | W | R | A |
| 3 | R | A | W |

The above sequence is repeated with periodic interruption to regenerate the water adsorption columns.

In this case, the total capacity of each adsorber decreases in proportion to its water saturation. The frequency of the periodic high-temperature regenerations increases with the water content of the gas.

(d) High-pressure water-saturated gas source — two small water adsorption columns (Nos. 1 and 2), two hydrocarbon adsorption columns (Nos. 3 and 4) with high-pressure regeneration.

| Cycle No. | Col. 1 | Col. 2 | Col. 3 | Col. 4 |
|---|---|---|---|---|
| 1 | W | WR | A | R |
| 2 | W | WR | R | A |
| 3 | W | WR | A | R |
| n | WR | W | A | R |
| n+1 | WR | W | R | A |
| n+2 | WR | W | A | R |

Then the above sequence is repeated.

The examples of adsorption-desorption sequences given heretofore are typical but by no means the only possibilities of cyclic operation to which the invention herein disclosed applies.

To further illustrate the present invention, the following examples are given:

EXAMPLE 1

Figure 4:
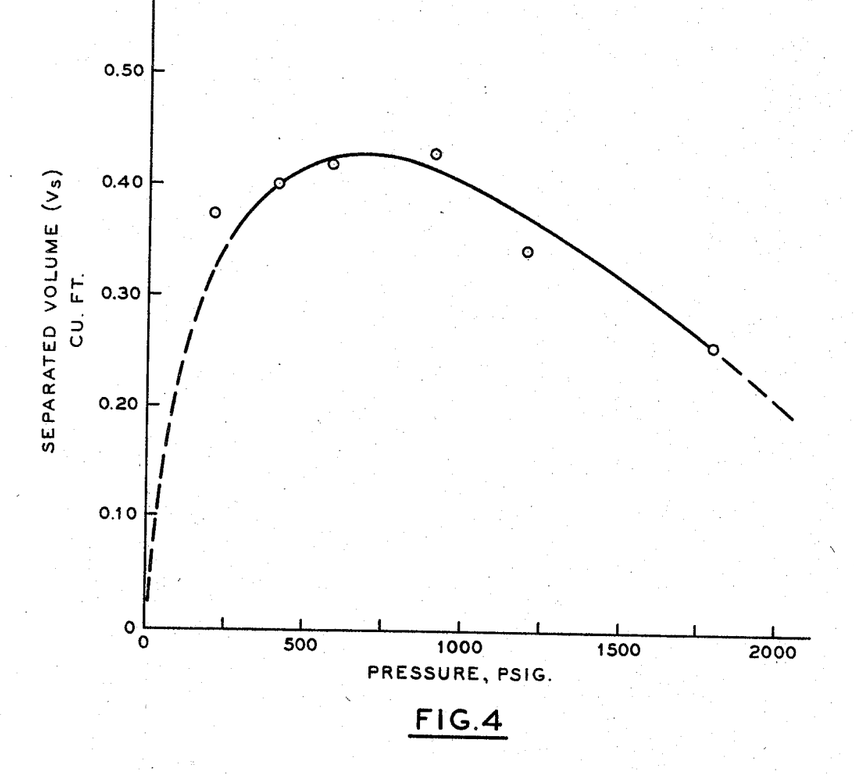

Through a column of silica gel adsorbent (granules of 14–20 mesh, bulk density of 45 lbs./cu. ft. and surface area of 511 sq. m./g.) was passed at a constant linear velocity of about 1 ft./min. a gas of the following composition: 96.43% methane, 2.21% n-pentane and the remainder fractional percentage of $C_2$ to $C_5$ hydrocarbons. All runs were conducted at 74° F. The gas was passed through the column at each selected pressure until n-pentane broke through as shown by chromatographic analysis of the effluent gas. After each run the silica gel was regenerated by heating to 600° F. with flowing nitrogen and then the adsorbent was cooled to 74° F. before the next run. The amount of feed gas passed through the column at efficient separation, i.e., up to breakthrough of n-pentane (allowance being made for feed to displace the gas left in the adsorbent column after regeneration) serves as a measure of the amount of n-pentane adsorbed and hence the adsorption capacity for n-pentane at the selected pressure. The results are plotted in FIGURE 4 and show that maximum adsorption takes place at about 650 p.s.i.g. and that much less adsorption capacity is shown at higher pressures such as 1800 p.s.i.g Hence, separation is achieved by adsorbing at the lower pressure at or near the maximum adsorption pressure and desorbing without a change in temperature with a gas at the higher pressure.

EXAMPLE 2

Figure 5:
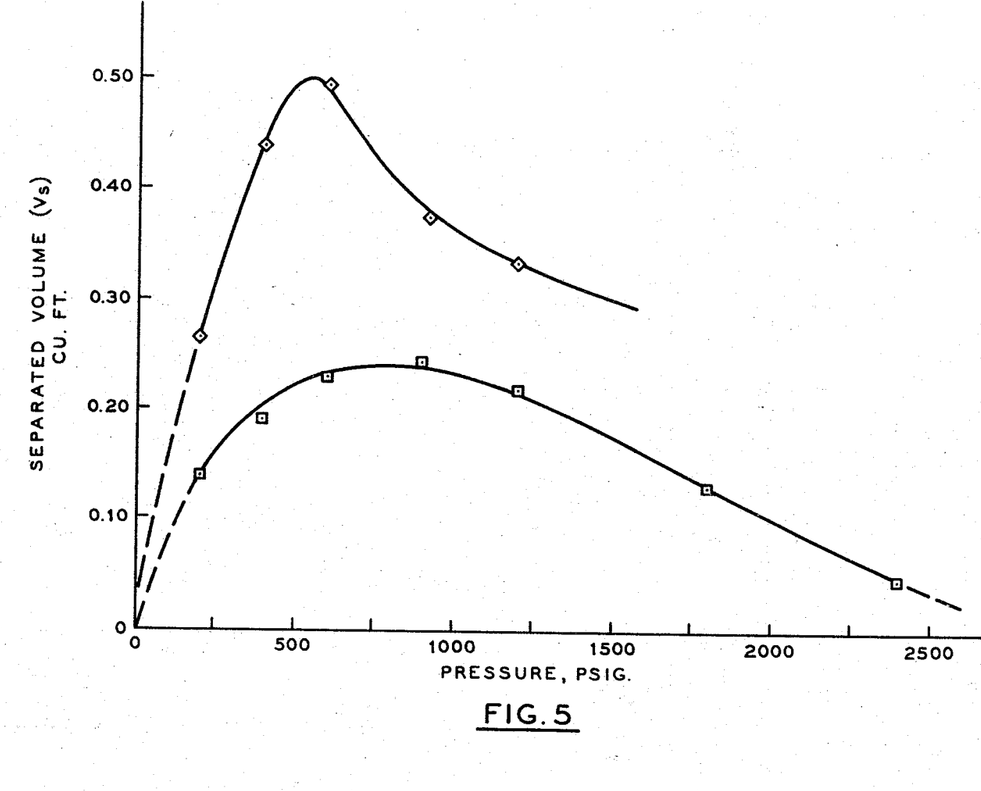

Similar curves were obtained for experiments carried out in the same manner with a gas composed of 93.00% methane, 5.42% n-butane and the remainder fractionl amounts of $C_2$–$C_5$ hydrocarbons. One curve was obtained with runs conducted at 74° F. and another curve for runs at 32° F. The results are plotted in FIGURE 5 and illustrate that separations can be made with regenerations through increased pressure and that a similar difference in pressure shows a higher difference in adsorption capacity at a lower temperature of operation.

EXAMPLE 3

Figure 6:
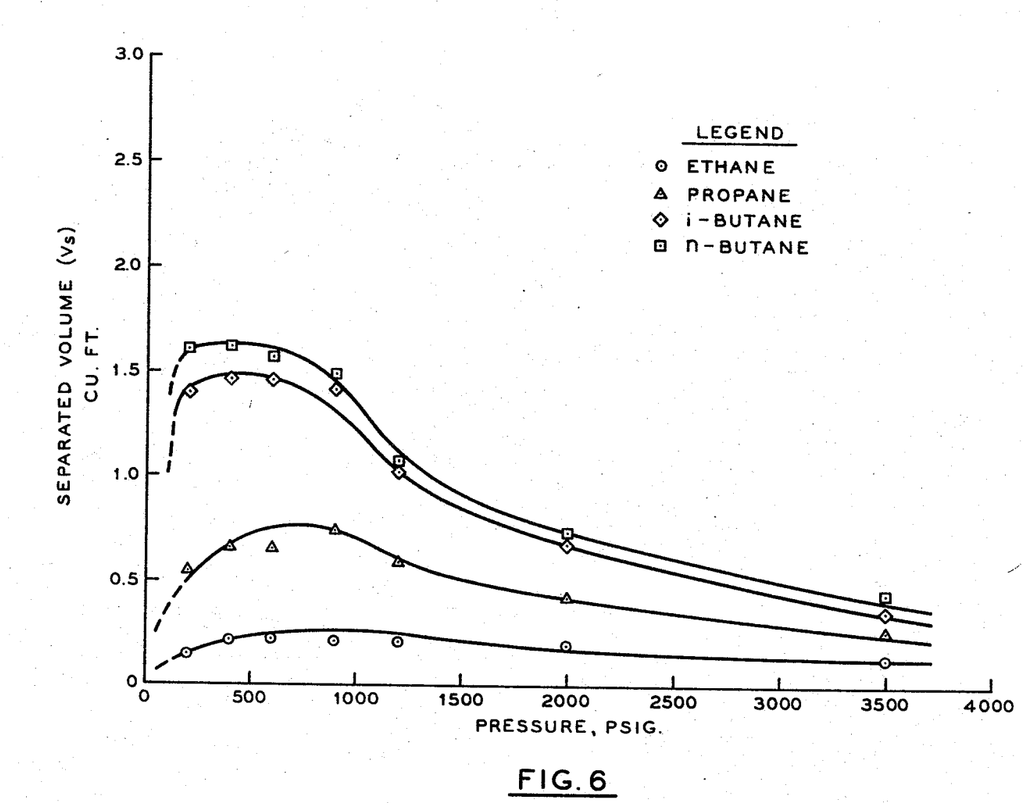

Also processed by the procedure described in Example 1 was a natural gas type mixture composed of 86.8% methane, 5.79% ethane, 4.32% propane, 1.16% isobutane and 1.92% n-butane. The volumes of gas were noted for the points at which the various components appeared in the effluent. The separated volumes thus obtained for a number of pressures are plotted in FIGURE 6. It will be seen that the greatest adsorption, particularly for the heavier components is at the lower pressures. Hence, for maximum recovery of butanes the adsorption should be carried out in the range between 200 and 1000 p.s.i. at 74° F. and desorption will occur at substantially higher pressures.

Adsorptions carried out under the same conditions with natural gas of different compositions containing higher molecular weight components gave similar results.

EXAMPLE 4

The desorption attained by the present method was measured by first completely saturating a silica gel adsorbent (same as used in Example 1) with isopentane from a mixture of isopentane and methane at 74° F. and 600 p.s.i., desorbing with a selected volume of methane gas, and then testing the desorption efficiency in terms of the amount of feed gas that could be passed through the adsorbent column to breakthrough of isopentane (i.e., separated volume). This procedure was repeated for several different pressures for the regeneration-desorption. In these tests, the total volume of gas to complete saturation indicates the point at which the adsorbent column is in equilibrium with the feed gas and this volume of gas was used as a guide for selecting the volume of gas to be used in desorption although, as indicated hereinabove, the large volumes used in these tests are not necessary or preferred for regeneration. The sequence of treating, after first activating the adsorbent column by heating at 600° F. with flowing nitrogen, and the gas volumes are given in the following table:

TABLE I

| Treating Sequence | Separated Volume, cc. | Total Volume To Complete Saturation, cc. | Volume Gas Used In Regeneration, cc. |
|---|---|---|---|
| 1. Adsorption | 36,248 | 66,715 |  |
| 2. Regeneration at 2,400 p.s.i. |  |  | 68,396 |
| 3. Adsorption after 2 | 44,350 | 67,595 |  |
| 4. Regeneration at 2,400 p.s.i. |  |  | 56,164 |
| 5. Adsorption after 4 | 43,433 | 70,346 |  |
| 6. Regeneration at 2,000 p.s.i. |  |  | 40,510 |
| 7. Adsorption after 6 | 44,119 | 66,733 |  |
| 8. Regeneration at 1,600 p.s.i. |  |  | 57,318 |
| 9. Adsorption after 8 | 47,882 | 66,227 |  |
| 10. Regeneration at 1,200 p.s.i. |  |  | 54,745 |
| 11. Adsorption after 10 | 47,054 | 66,063 |  |
| 12. Regeneration at 1,000 p.s.i. |  |  | 53,040 |
| 13. Adsorption after 12 | 48,128 | 69,108 |  |

The above results show that the adsorption capacity is recovered by desorption-regeneration by increased pressure without increasing the temperature, there being some increases in adsorption capacity with repeated regenerations, which indicate a benefit to cyclical repetition of the method of the present invention.

EXAMPLE 5

The procedure of Example 4 was also employed with the same feed and an activated charcoal adsorbent (8–14 mesh, bulk density: 31.3 lbs./cu. ft. and surface area: 728 sq. m./g.). The data are shown in the following table:

TABLE II

| Treating Sequence | Separated Volume, cc. | Total Volume To Complete Saturation, cc. | Volume Gas Used In Regeneration, cc. |
|---|---|---|---|
| 1. Adsorption (after regeneration by heating at 600° F. in flowing nitrogen for 2½ hours) | 13,419 | 26,065 |  |
| 2. Regeneration at 2,400 p.s.i. |  |  | 55,278 |
| 3. Adsorption after 2 | 33,597 | 46,662 |  |
| 4. Regeneration at 2,400 p.s.i. |  |  | 44,629 |
| 5. Adsorption after 4 | 33,339 | 45,935 |  |
| 6. Regeneration at 2,000 p.s.i. |  |  | 83,232 |
| 7. Adsorption after 6 | 37,305 | 49,051 |  |
| 8. Regeneration at 2,000 p.s.i. |  |  | 43,460 |
| 9. Adsorption after 8 | 31,280 | 42,897 |  |
| 10. Regeneration at 1,000 p.s.i. |  |  | 42,750 |
| 11. Adsorption after 10 | 22,945 | 33,132 |  |

The above results illustrate that the process of the present invention can be used with activated charcoal.

Similar results were obtained with activated alumina (8–20 mesh, bulk density 55 lbs./cu. ft. and surface area: 234 sq. m./g.).

Experimental results show that counterflow regeneration permits a sharper breakthrough of the key component and, in general, less loss of recoverable gasoline fractions with the sales gas, especially if the regeneration is, for any reason, incomplete. Hence, counterflow regeneration would be particularly preferred for regeneration conducted at the lower end of the high-pressure range for regeneration.

I claim:

1. The improved process of recovering natural gasoline from a natural gas feed containing natural gasoline using an adsorbent to adsorb thereon said natural gasoline, the adsorption of said natural gasoline on said adsorbent increasing through a maximum and then decreasing as the pressure is increased which comprises passing said feed over said adsorbent to adsorb thereon said natural gasoline components from said feed, continuing said adsorbing step until a substantial amount of natural gasoline components have been adsorbed and thereafter desorbing said natural gasoline components by passing gas over said adsorbent at a pressure which is greater than the higher of the two pressures at which the adsorption is the same as in said adsorbing step.

2. The process of claim 1 wherein the desorbing step is carried out without external heating of the desorbing gas.

3. The process of claim 1 wherein the desorbing step is carried out with an increase in temperature of the desorbing gas no greater than due to compression of said gas from the pressure in said adsorbing step to the pressure in said desorption step.

4. The process of claim 1 wherein said gas used in said desorbing step is the natural gas feed.

5. The process of claim 1 wherein the enriched natural gas effluent from the desorbing step is reduced in pressure to cause a condensation of the natural gasoline components, the condensed natural gasoline components are recovered and the remaining gas at the lowered pressure is passed as feed over the adsorbent to adsorb thereon natural gasoline components.

6. The process of claim 1 wherein the pressure in said adsorbing step is in the range of 300 to 1200 p.s.i. and the pressure in the said desorbing step is sufficiently higher to get substantial desorption of the adsorbed natural gasoline components.

7. The process of claim 1 wherein said adsorbent is silica gel.

8. The process of claim 1 wherein said adsorbent is activated charcoal.

9. The process of claim 1 wherein said adsorbent is a high surface area alumina.

10. The process of separating heavier hydrocarbons from a mixture consisting predominantly of normally gaseous hydrocarbons and said heavier hydrocarbons dispersed in said lighter gaseous hydrocarbons using an adsorbent to adsorb thereon said heavier hydrocarbons, the adsorption of said heavier hydrocarbons on said adsorbent increasing through a maximum and then decreasing as the pressure is increased which comprises passing said mixture over said adsorbent under conditions to adsorb said heavier hydrocarbons at a pressure near the pressure at which maximum adsorption occurs, continuing said adsorbing step until a substantial amount of said hydrocarbons have been adsorbed and thereafter desorbing said heavier hydrocarbons by passing gas over said adsorbent at a pressure greater than the higher of the two pressures, including the adsorption pressure, at which substantially the same adsorption occurs as in said adsorbing step.

11. The process for treating a high pressure feed mixture of normally gaseous hydrocarbons and heavier hydrocarbons to separate said heavier hydrocarbons from said mixture, which comprises lowering the pressure of a first part of said mixture to a pressure near to the pressure at which maximum adsorption of said heavier hydrocarbons occurs, passing said first part of said mixture at said lowered pressure over an adsorbent and adsorbing said heavier hydrocarbons, continuing said adsorbing step until the adsorbent has been at least partially saturated with said heavier hydrocarbons, discontinuing said adsorbing step, cooling a second part of said feed mixture to condense some of the heavier hydrocarbons contained therein, thereby obtaining a mixture partially depleted of its heavier hydrocarbons, and thereafter passing said depleted second part of the feed mixture over said at least partially saturated adsorbent at close to the original high pressure of said feed mixture to desorb said heavier hydrocarbons from said adsorbent and to obtain an effluent mixture enriched in said heavier hydrocarbons.

12. The improved process of recovering heavier hydrocarbons from a gaseous stream at high pressure using an adsorbent to adsorb thereon said heavier hydrocarbons, the adsorption of said heavier hydrocarbons on said adsorbent increasing through a maximum and then decreasing as the pressure is increased which comprises:

(1) cooling part of said stream to condense some of the heavier hydrocarbons therein, (2) separating the resulting uncondensed gas from the condensed liquid, (3) indirectly contacting said uncondensed gas with the warmer feed gas stream to effect at least a portion of said cooling of the feed stream to produce a partially cooled high pressure gas stream and to produce a warmed uncondensed gas stream, (4) passing said warmed gas stream through a first bed of adsorbent which by contact with a gas stream at a lower pressure, has adsorbed thereon a substantial amount of said heavier hydrocarbons, thereby regenerating said adsorbent and producing as an effluent from said first adsorbent bed a stream of gas enriched in said heavier hydrocarbons, (5) flashing the enriched gas stream to a substantially lower pressure near the maximum adsorption pressure, thereby causing part of said heavier hydrocarbons to condense and producing a gas stream reduced in pressure and partially depleted of said heavier hydrocarbons, (6) contacting indirectly at least part of said partially cooled high pressure gas feed stream with said enriched gas stream in the flashing zone to cool further said feed stream, thereby condensing some of the heavier hydrocarbons and permitting their separation as a liquid, and (7) passing said reduced-pressure gas through a previously-regenerated second adsorbent bed to adsorb the remaining heavier hydrocarbons on said adsorbent and to produce an effluent gas stream substantially free of said heavier hydrocarbons, the pressure of the gas contacting said first adsorbent bed during its regeneration being substantially higher than the higher of the two pressures at which the adsorption is the same as that during adsorption on said second adsorption bed.

References Cited

UNITED STATES PATENTS

| | | | |
|---|---|---|---|
| 2,702,826 | 2/1955 | Kirshenbaum et al. | 55—62 X |
| 3,007,543 | 1/1961 | Maher | 55—62 X |
| 3,192,687 | 7/1965 | Silva et al. | 55—62 X |

REUBEN FRIEDMAN, *Primary Examiner.*

J. ADEE, *Assistant Examiner.*